United States Patent
Klosinski et al.

(10) Patent No.: US 7,996,161 B2
(45) Date of Patent: Aug. 9, 2011

(54) PROCESS FLUID PRESSURE TRANSMITTER WITH PRESSURE TRANSIENT DETECTION

(75) Inventors: Andrew J. Klosinski, Waconia, MN (US); Gregory J. LeCuyer, Eden Prairie, MN (US); Dale H. Perry, Burnsville, MN (US); David L. Wehrs, Eden Prairie, MN (US); Steve VanderSanden, Hopkins, MN (US)

(73) Assignee: Rosemount Inc., Eden Prairie, MN (US)

( * ) Notice: Subject to any disclaimer, the term of this patent is extended or adjusted under 35 U.S.C. 154(b) by 224 days.

(21) Appl. No.: 12/323,863

(22) Filed: Nov. 26, 2008

(65) Prior Publication Data
US 2009/0139346 A1    Jun. 4, 2009

Related U.S. Application Data

(60) Provisional application No. 61/004,662, filed on Nov. 29, 2007.

(51) Int. Cl.
*G01L 11/00*   (2006.01)
*G06F 17/00*   (2006.01)

(52) U.S. Cl. ............. 702/50; 702/47; 702/138; 700/301
(58) Field of Classification Search ............ 702/50, 702/47, 138
See application file for complete search history.

(56) References Cited

U.S. PATENT DOCUMENTS

| | | | |
|---|---|---|---|
| 6,539,267 B1 * | 3/2003 | Eryurek et al. | 700/51 |
| 6,595,035 B1 * | 7/2003 | Maley | 73/19.03 |
| 7,018,800 B2 * | 3/2006 | Huisenga et al. | 435/6 |
| 7,085,610 B2 * | 8/2006 | Eryurek et al. | 700/29 |
| 7,219,553 B1 * | 5/2007 | Worthington | 73/753 |
| 7,254,518 B2 | 8/2007 | Eryurek et al. | 702/183 |
| 2004/0249583 A1 * | 12/2004 | Eryurek et al. | 702/47 |
| 2005/0072239 A1 * | 4/2005 | Longsdorf et al. | 73/649 |

(Continued)

FOREIGN PATENT DOCUMENTS

EP   0248633   6/1987

(Continued)

OTHER PUBLICATIONS

"Pipetech International Announces the Release of its Advanced Transient Pressure Monitoring System," Pipetech International press release (Sep. 5, 2004), 1 page.

(Continued)

*Primary Examiner* — Hal D Wachsman
(74) *Attorney, Agent, or Firm* — Christopher R. Christenson; Westman, Champlin & Kelly, P.A.

(57) ABSTRACT

A process fluid pressure transmitter includes a process fluid pressure sensor, measurement circuitry, a controller and a loop communicator. The pressure sensor is coupleable to a source of process fluid pressure. Measurement circuitry is coupled to the process fluid pressure sensor and provides a signal indicative of the electrical characteristic of the process fluid pressure sensor. The controller receives the signal from the measurement circuitry and calculates a process fluid pressure based at least in part upon the signal. The controller is also configured to detect a process fluid pressure transient and store at least one parameter related to the process fluid pressure transient. The loop communicator is coupled to the controller and is configured to provide a signal over a process communication loop based upon the process fluid pressure. The process fluid pressure transmitter is also configured to provide an indication related to the at least one stored parameter.

26 Claims, 8 Drawing Sheets

U.S. PATENT DOCUMENTS

2007/0010968 A1* 1/2007 Longsdorf et al. ............ 702/183
2007/0169557 A1 7/2007 Harasyn et al.
2008/0208527 A1* 8/2008 Kavaklioglu ................. 702/179

FOREIGN PATENT DOCUMENTS

WO    WO 01/16571 A1    3/2001

OTHER PUBLICATIONS

"Identifying Pressure Transients," Pipetech International (2008), 3 pages.
International Search Report and Written Opinion for application PCT/US2008/084907, dated Mar. 4, 2009.

* cited by examiner

PROCESS FLUID PRESSURE TRANSMITTER WITH PRESSURE TRANSIENT DETECTION

CROSS-REFERENCE TO RELATED APPLICATION

The present application is based on and claims the benefit of U.S. provisional patent application Ser. No. 61/004,662, filed Nov. 29, 2007, the content of which is hereby incorporated by reference in its entirety.

BACKGROUND

Industrial process installations are often very complex, utilizing hundreds or even thousands of feet of process fluid pressure piping, as well as a vast array of process devices, such as pumps, valves, process variable transmitters, and many others. Generally, these devices are exposed to process fluid while the process operates.

Pressure transients within the process fluid system can have an adverse on the integrity of pipelines, connected process devices and/or pipeline operations. Actuation of valves or pumps can cause undetected transients (relatively brief spikes in process fluid pressure). These process fluid pressure transients can damage a pipeline and eventually lead to catastrophic failure. Most pressure transients occur without ever being noticed and can cause incremental damage to the pipe structure, protective coatings, thrust restraints, gaskets or seals every time a transient occurs. Accumulated damage of this nature can significantly weaken the system which conveys the process fluid.

Pressure transients can be caused by a number of sources. Pressure transients can occur whenever there is a change in the velocity of process fluid flow. Some causes of process fluid pressure transients include: changes in customer delivery rates; actuation of control valves or similar devices; power outages; and engagement and/or disengagement of process fluid pumps. Some process fluid pressure transients can even exceed the design pressure of a pipe.

Attempts have been made to provide systems that can detect these pressure transients. Such systems have generally been comprised one or more dynamic pressure sensors that are installed in an operating fluid chamber and convey their signals to a signal processor. The signal processor then analyzes the data and displays and output for the operator. Such systems appear to be directed wholly toward detecting and capturing data relative to pressure transients within a pipeline system. Accordingly, in order to employ known pressure transient detection systems, it is necessary to purchase, or otherwise obtain, such systems; disrupt the process while the one or more dynamic pressure sensors are installed therein; and reengage the process thereafter. Further, once the process fluid pressure transient study is complete, such detection systems must generally be removed from the process through similar disruption. This is because current systems are not generally of the type of device suitable for long-term exposure to the environments to which process devices are designed.

Process devices usually have a field-hardened enclosure so that they can be installed outdoors in relatively rugged environments and are able to withstand climatological extremes of temperature, humidity, vibration, mechanical shock, et cetera Providing the advantages of advanced process fluid pressure transient detection within a process fluid installation without requiring both the additional capital investment and process disruptions of previous methods would represent a significant advance in the field of process fluid control.

SUMMARY

A process fluid pressure transmitter includes a process fluid pressure sensor, measurement circuitry, a controller and a loop communicator. The process fluid pressure sensor has an electrical characteristic that varies with process fluid pressure. The pressure sensor is coupleable to a source of process fluid pressure. The measurement circuitry is coupled to the process fluid pressure sensor and provides a signal indicative of the electrical characteristic of the process fluid pressure sensor. The controller is coupled to the measurement circuitry and receives the signal and calculates a process fluid pressure based at least in part upon the signal. The controller is also configured to detect a process fluid pressure transient and store at least one parameter related to the process fluid pressure transient. The loop communicator is coupled to the controller and is configured to provide a signal over a process communication loop based upon the process fluid pressure. The process fluid pressure transmitter is also configured to provide an indication related to the at least one stored parameter.

DETAILED DESCRIPTION OF ILLUSTRATIVE EMBODIMENTS

Figure 1:
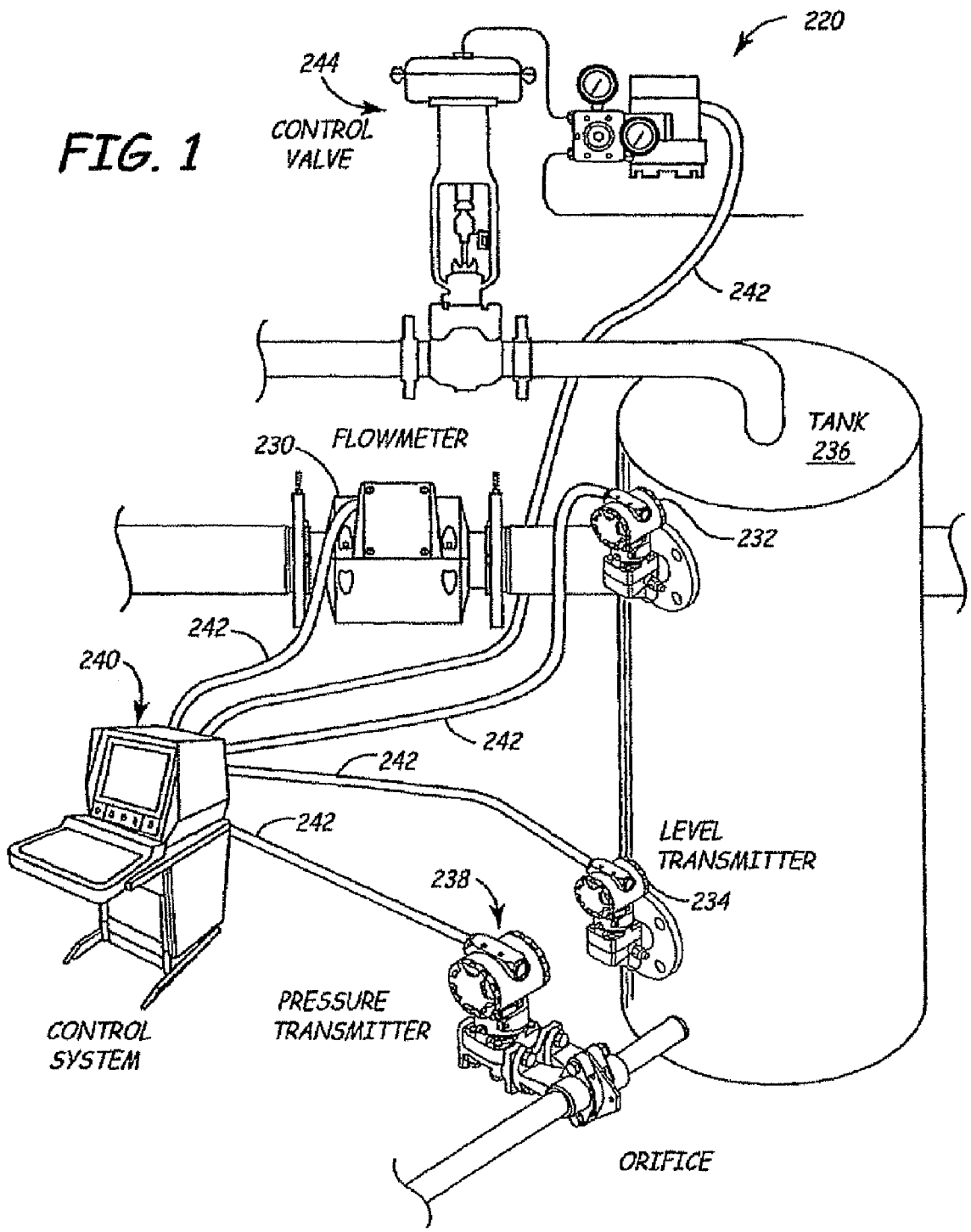
FIG. 1 is an illustration of a typical fluid processing environment for a diagnostic pressure transmitter in accordance with the prior art.

In FIG. 1, a typical process fluid environment for pressure measurement is illustrated at 220. In FIG. 1, process variable transmitters such as flow meter 230, level (pressure) transmitters 232, 234 on tank 236 and integral orifice flow meter 238 are shown connected to control system 240. Process variable transmitters can be configured to monitor one or more process variables associated with fluids in a process plant such as slurries, liquids, vapors and gasses in chemical, pulp, petroleum, gas, pharmaceutical, food and other fluid processing plants. The monitored process variables can be pressure, temperature, flow, level, pH, conductivity, turbidity, density, concentration, chemical composition or other properties of fluids. Process variable transmitter includes one or more sensors that can be either internal to the transmitter or external to the transmitter, depending on the installation needs of the process plant. A process variable transmitter generates one or more transmitter outputs that represent the sensed process variable. Transmitter outputs are configured for transmission over long distances to a controller or indicator via communication buses 242. In typical fluid processing plants, a communication bus 242 can be a 4-20 mA current loop that powers the transmitter, a FOUNDATION™ Fieldbus connection, or a hybrid protocol such as the Highway Addressable Remote Transducer (HART) protocol. Communication bus 242 provides communication between process devices and/or communication with a controller or a control system. These process devices also typically operate on relatively low power. For example, process devices are currently available that receive all of their operating power from a known 4-mA current loop. Such low-power operation is sometimes required to provide intrinsic safety in explosive atmospheres.

Control system 240 can be programmed to display diagnostic information for a human operator, or can be programmed to alter its operation when there is a diagnostic warning from a process device. Control system 240 controls the operation of output devices such as control valve 244, pump motors or other controlling devices.

Figure 2:
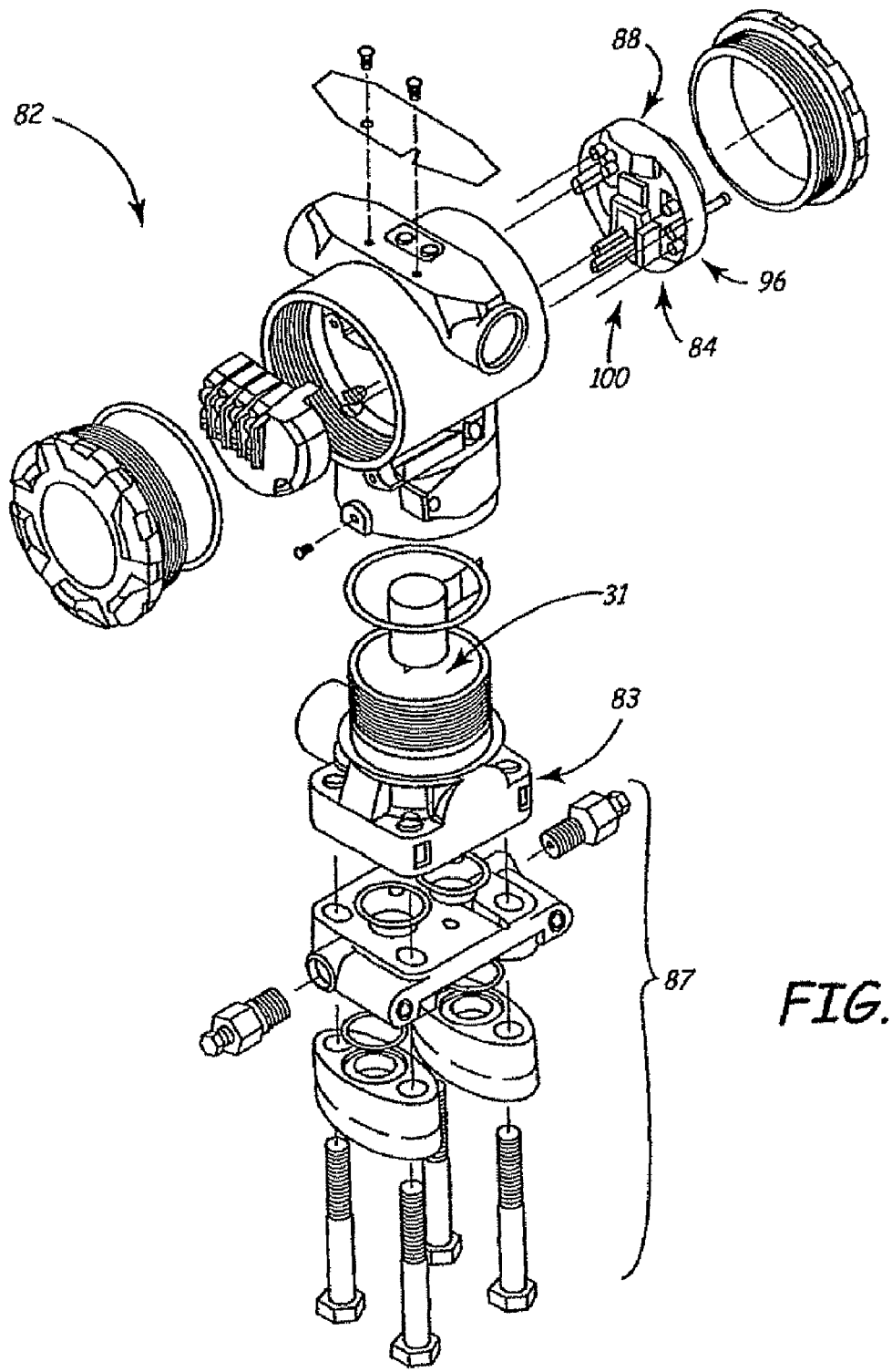
FIG. 2 is a pictorial illustration of a prior art differential pressure transmitter used in a fluid flow meter.

In FIG. 2, an exploded view of a typical process fluid pressure transmitter 82 is shown generally. Transmitter 82 includes a flange 83 for receiving a differential pressure, a differential pressure sensor 31, electronics including an analog to digital converter 84, a microprocessor system 88, a digital to analog converter 96, and a digital communications circuit 100. Transmitter 82 is bolted to flange adapter 87. In embodiments shown herein, sensor 31 can comprise an absolute, gage, differential or other type of pressure sensor.

Embodiments of the present invention generally include a process fluid pressure transmitter (such as an absolute, gauge or even differential pressure transmitter) that is configured not only to measure and report a process fluid pressure over a process communication loop, but also is configured to detect and record information relative to pressure transients within the process fluid piping. This allows a single device that is already ubiquitous within the process industry to provide process fluid pressure transient detection thereby obviating the need for additional capital investment and technician time. Further still, embodiments of the present invention are believed to be practicable using legacy hardware. Specifically, the Model 3051S process fluid pressure transmitter, available from Rosemount Inc., of Chanhassen, Minn., can either be programmed to provide this additional function or can be provided with a feature board having its own microprocessor. The Model 3051S, provides process variable information over a process communication loop at a rate of approximately 1-2 times per second. However, the Model 3051S actually measures process fluid pressure 22 times per second. Thus, although a process controller reviewing the process fluid pressure information reported by the Model 3051S may not adequately observe a pressure transient, the process device itself has more than adequate resolution to detect a pressure transient. Even though the rate at which raw pressure readings are obtained from the pressure sensor by the pressure transmitter is quite fast, it may not be adequate to capture the true maximum pressure, since the maximum pressure could occur in the interval between two pressure readings. However, the pressure readings both immediately before and immediately after the maximum would still be highly elevated thus allowing detecting of the pressure transient.

As set forth above, transient detection can be built in to a process pressure transmitter, or added later using a feature board. The feature board is located in the electronics enclosure of the process device and provides transient detection. In this manner, important pressure transient information can be detected and communicated without having to shut down or otherwise disrupt the process fluid system to install additional sensors.

Figure 3:
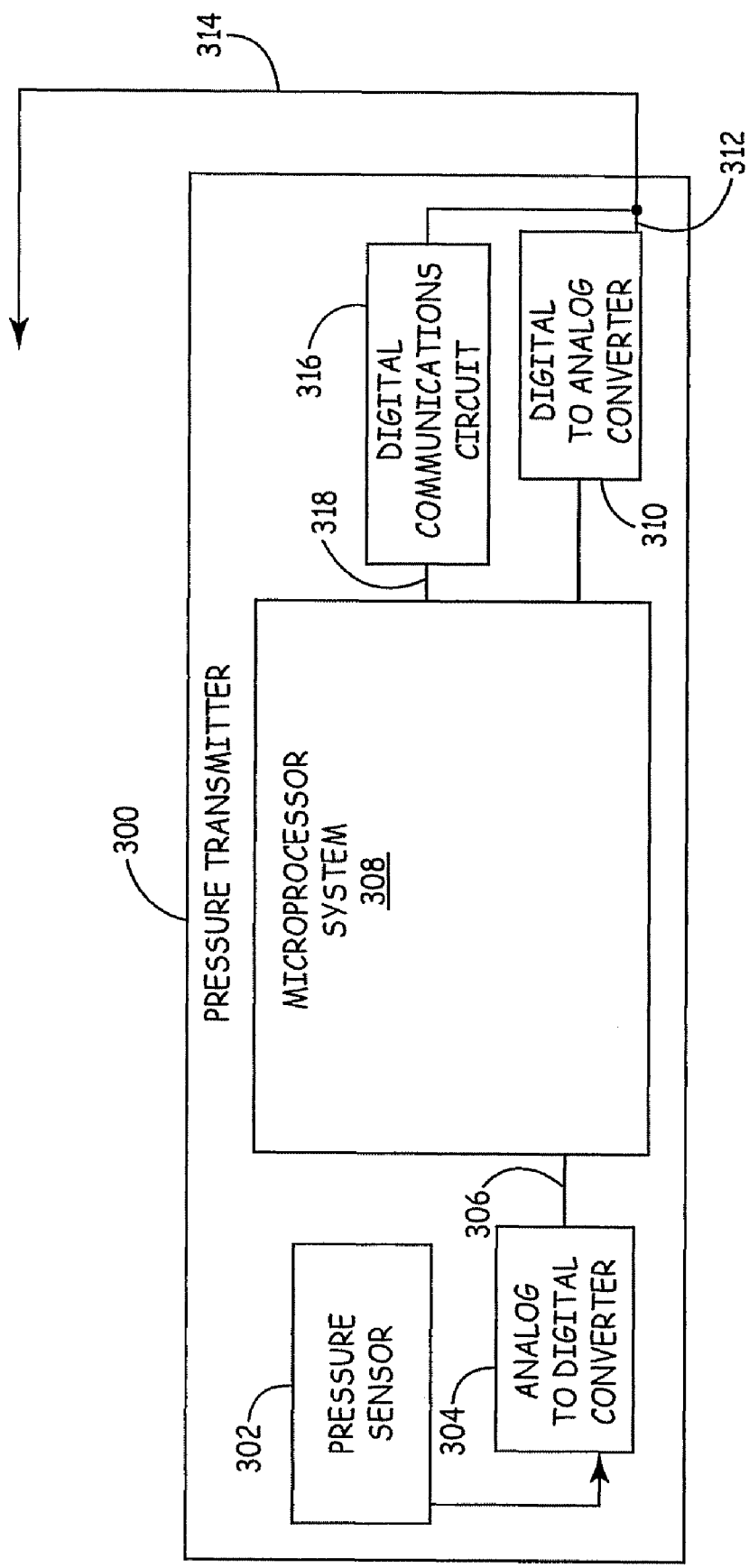
FIG. 3 is a block diagram of a process fluid pressure transmitter with which embodiments of the present invention are particularly applicable.

FIG. 3 is a diagrammatic view of a process fluid pressure transmitter with which embodiments of the present invention are particularly appropriate. Process fluid pressure transmitter 300 includes a pressure sensor 302 that may be an absolute pressure sensor, a gage pressure sensor, or a differential pressure sensor. Pressure sensor 302 is operably coupled to a source of process fluid pressure in a manner that is known in the art (not shown). Examples of process fluid pressure sensor 302 include known sensors that have a conductive diaphragm that deflects in response to a process fluid pressure, where the deflected conductive diaphragm generates a change in capacitance that reflects the pressure.

Pressure sensor 302 is coupled to analog to digital converter 304. Analog to digital converter 304 can be any suitable analog to digital converter, but is preferably a known Sigma-Delta converter. Analog to digital converter 304 generates a digital value on line 306 to microprocessor system 308 that reflects the analog electrical characteristic of pressure sensor 302. Microprocessor system 308 calculates a process fluid pressure based upon the digital signal provided is by analog to digital converter 304 via line 306. Additionally, microprocessor system 308 may compensate and/or linearize the process fluid variable in accordance with known techniques. The process fluid variable is then passed to digital to analog converter 310 which generates an analog signal on line 312 that is imparted upon process communication loop 314 in accordance with known techniques. Transmitter 300 is considered a smart transmitter by virtue of utilization of microprocessor system 308. Further, like many modern-day process variable transmitters, pressure transmitter 300 includes a digital communication circuit 316 that can receive information from microprocessor system 308 via line 318 and generate digital signals on process communication loop 314. Further, digital communication circuit 316 is also configured to receive digital communication signals from process communication loop 314 and provide those signals to microprocessor system 308. In this manner, process fluid pressure transmitter 300 can provide process variable information, such as the process fluid pressure via an analog signal imparted using digital to analog converter 310, but can provide additional digital communication using digital communications circuit 316. A suitable example of such hybrid communication is the known HART (Highway Addressable Remote Transducer) process communication protocol. Additionally, other process communication protocols are known that can transmit all of the information, both process variable and additional information in exclusively digital format. Examples of such protocols include the FOUNDATION™ Fieldbus process communication protocol.

Microprocessor system 308 preferably includes memory, or is coupled to suitable memory, that stores program instructions which, when executed by microprocessor system 308, cause microprocessor system 308 to provide pressure transient detection and/or communication. Additionally, it is preferred that the detection of pressure transients be performed using user-provided process fluid pressure thresholds. Such thresholds may prescribe limits above and/or below which define a process fluid pressure transient. These thresholds can be provided by a user either through a known handheld field maintenance tool, such as the Model 375 handheld field maintenance tool available from Fisher-Rosemount Systems, Inc., of Austin, Tex., or communicated through the process communication loop 314 using suitable control room software, such as the asset management suite (AMS) available from Fisher-Rosemount Systems, Inc. Additionally, or alternatively, pressure transient detection can include temporal thresholds which define how quickly the process fluid pressure must change. Thus, a transient may be defined by a user to be simply a process fluid pressure excursion beyond a selected threshold, or it could be an excursion beyond a threshold that returns within a user-provided time window.

Thus, the process fluid pressure transmitter not only provides its normal function of accurately measuring and reporting process fluid pressure, but process fluid pressure transient detection as well. If a transient is detected, microprocessor system 308 will record or otherwise store event information relative to the detected transient. Examples of such information include simply setting a flag indicating that a control limit has been exceeded and/or potentially setting an alert either locally at process fluid pressure transmitter 300 or communicating the alert through process communication loop 314. Further, microprocessor system 308 may start a timer, or store an indication of time, that indicates or can be used to provide elapsed time since the threshold was exceeded. Further still, the time at which the process fluid pressure returns from its excursion beyond the threshold can also be stored in order to provide or indicate total time elapsed while the pressure threshold is exceeded. Another parameter that can be detected and stored is the maximum pressure measured during the transient. Further, the time at which a maximum pressure was measured can also be stored to provide an indication of time lapse since the maximum pressure was detected. Another parameter that can be stored is a running count of a number of pressure transients (either above a maximum threshold, below a minimum threshold or both) since device reset or power on. Any or all of this information can be stored and/or communicated by pressure transmitter 300 as event information relative to a detected pressure transient. The stored information can be communicated to the control room and/or a handheld field maintenance tool as appropriate. Moreover, by storing a combination of parameters relative to a transient, important features of the transient can be recreated graphically. Such graphical representations can be provided using known Electronic Device Description Language (EDDL) technology to an asset management system or a handheld field maintenance tool. Further still, in some embodiments, once a transient is detected, the pressure transmitter can store each high speed raw pressure measurement along with a time-stamp. With respect to the Model 3051S pressure transmitter, this would mean storing each 22 Hz pressure measurement in memory and retaining such values until they are either reset by a user, or overwritten. Such storage allows a user to view the transient in greater detail than would otherwise be available using only the stored parameters. Such enhanced detail may assist a technician with root-cause fault analysis relative to the transient.

Figure 4:
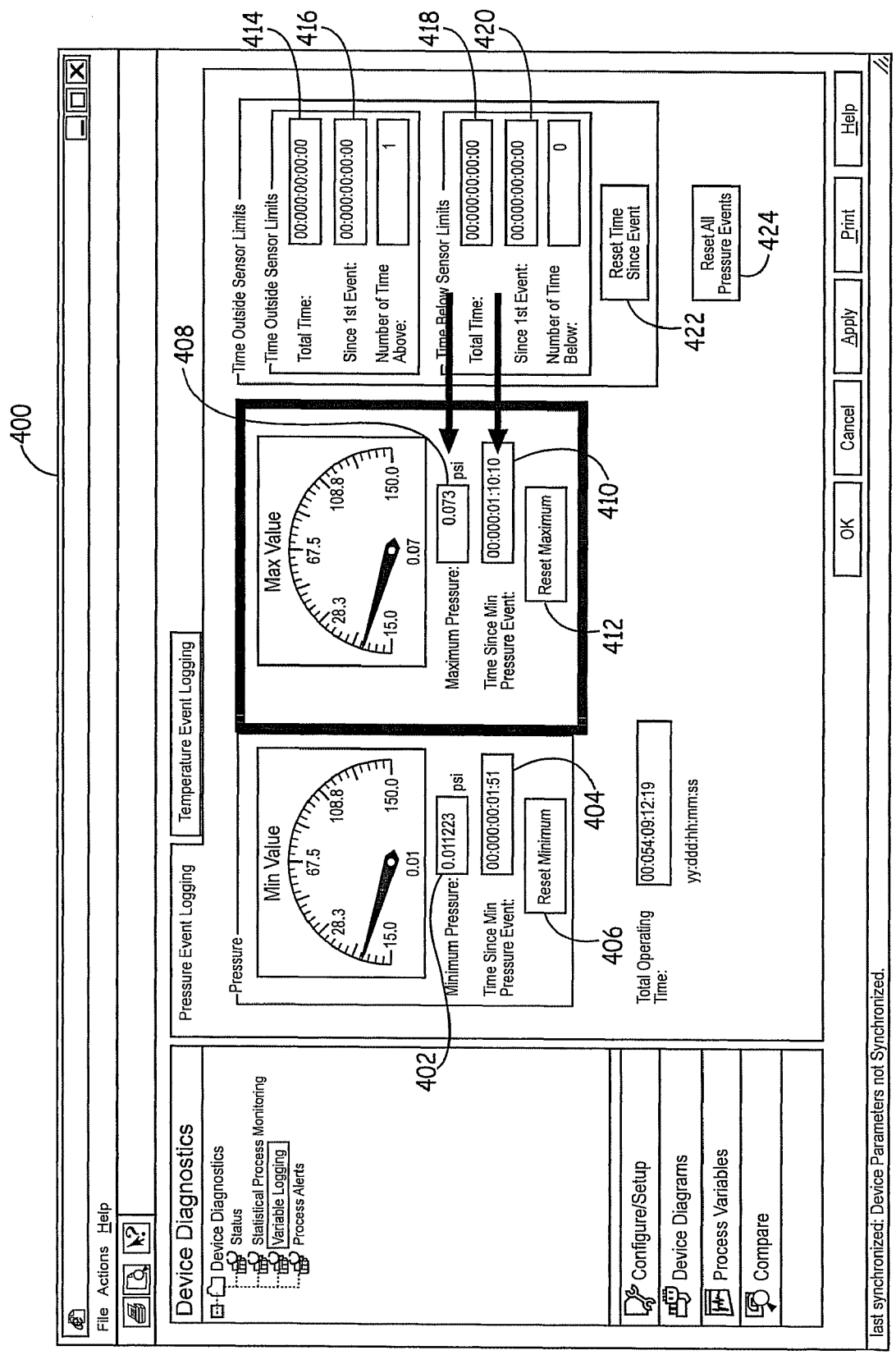
FIG. 4 is a diagrammatic view of a user interface allowing a user to view process fluid pressure transient information in accordance with embodiments of the present invention.

FIG. 4 is a diagrammatic view of an exemplary user interface 400 presented to a user of a control station, such as control station 240 (shown in FIG. 1), while interacting with process fluid pressure transmitter 300 (shown in FIG. 3) via process communication loop 314 (shown in FIG. 3). As illustrated in FIG. 4, the user is able to preferably view both minimum and maximum pressures observed by the process fluid pressure transmitter since the last reset. Specifically, FIG. 4 illustrates a minimum pressure window 402 displaying a value of 0.011223 psi above time window 404 showing time elapsed since that minimum pressure event was recorded. As illustrated, user interface element 406 allows the user to reset the minimum. Similarly, maximum pressure window 408 illustrates a maximum pressure detected since the last reset or power-on condition. Since the maximum rate at which raw pressure sensor readings are obtained may not be fast enough to capture the exact maximum pressure of the pressure transient, the reading may simply reflect a highly elevated reading, which can still provide important information. Also, user interface 400 includes time window 410 indicating time since the maximum pressure recorded in window 408 was received. Finally, a user interface element 412 allows the user to selectively reset the maximum pressure information. FIG. 4 also illustrates that total time spent above the upper sensor limit can be recorded and displayed, as illustrated in window 414. Further, time elapsed since the first high pressure overpressure is displayed in box 416. Additionally, box 418 shows total time spent below a low pressure threshold. Box 420 displays information illustrating elapsed time since the first excursion below the low pressure threshold. Further still, "time since" values can be reset using user interface element 422 and/or using a global reset for all pressure events that can be sent to the process fluid pressure transmitter when the user presses or otherwise engages user interface element 424.

Figure 5:
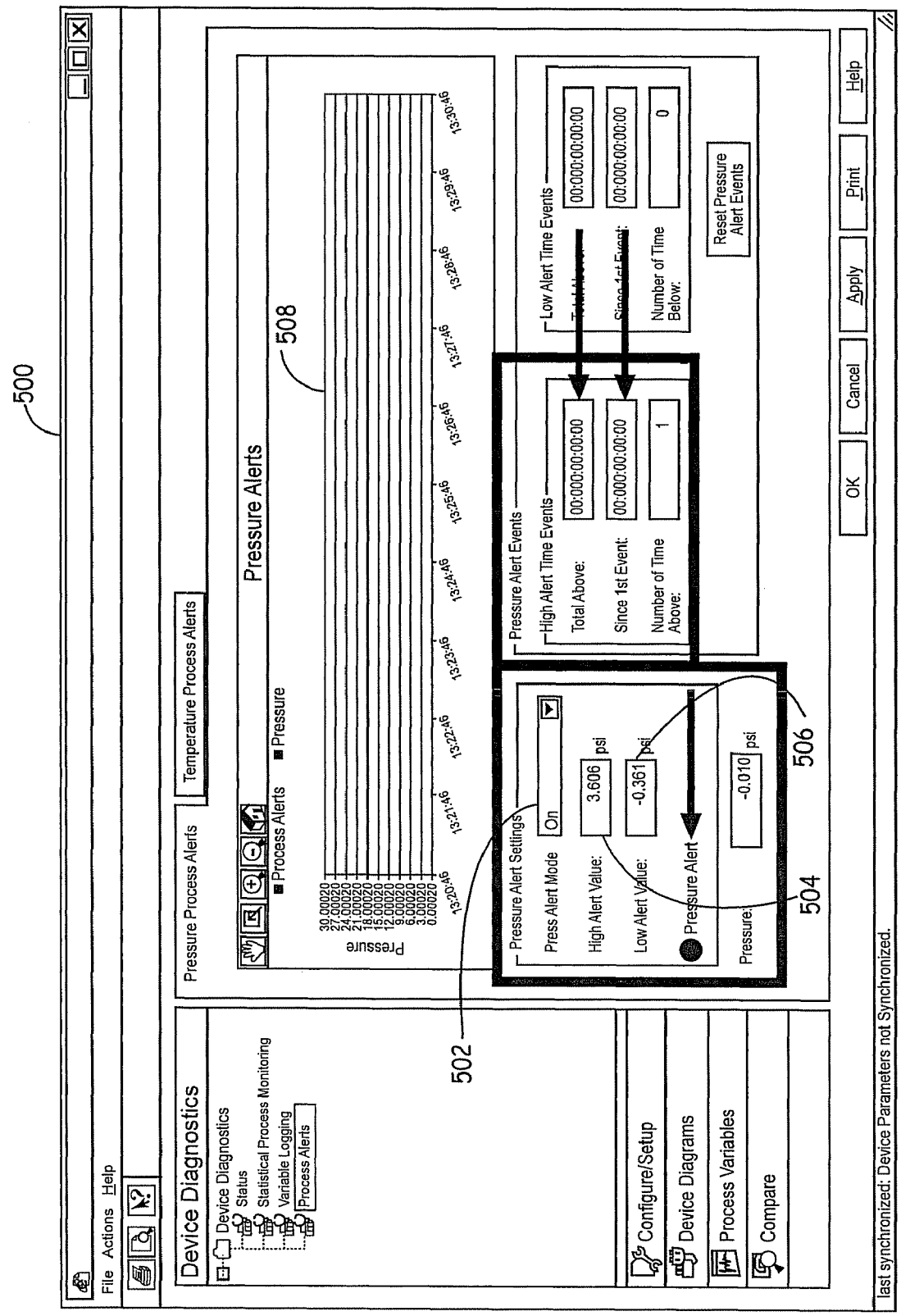
FIG. 5 is a diagrammatic view of a user interface allowing a user to set process fluid pressure transient threshold information in accordance with embodiments of the present invention.

FIG. 5 is a diagrammatic screen shot of user interface 500 presented upon controller, such as controller 240 (shown in FIG. 1), to allow a user to interact with process fluid pressure transmitter 300 (shown in FIG. 3) via process communication loop 314 (shown in FIG. 3). As illustrated in FIG. 5, user interface 500 provides the user with the ability to selectively engage pressure alert mode as illustrated at drop down box 502 as well as to insert threshold values for both high pressure alert and low pressure alert, boxes 504 and 506, respectively. Moreover, user interface 500 allows the user to view pressure alerts on a chronological scale as illustrated in pressure vs. time chart 508 presented on user interface 500.

While FIGS. 4 and 5 have been described with respect to the user interface of a process controller, it is expressly contemplated that the various information and/or selectable parameters can be presented to a user via a handheld field maintenance device coupled to the process fluid pressure transmitter.

Figure 6:
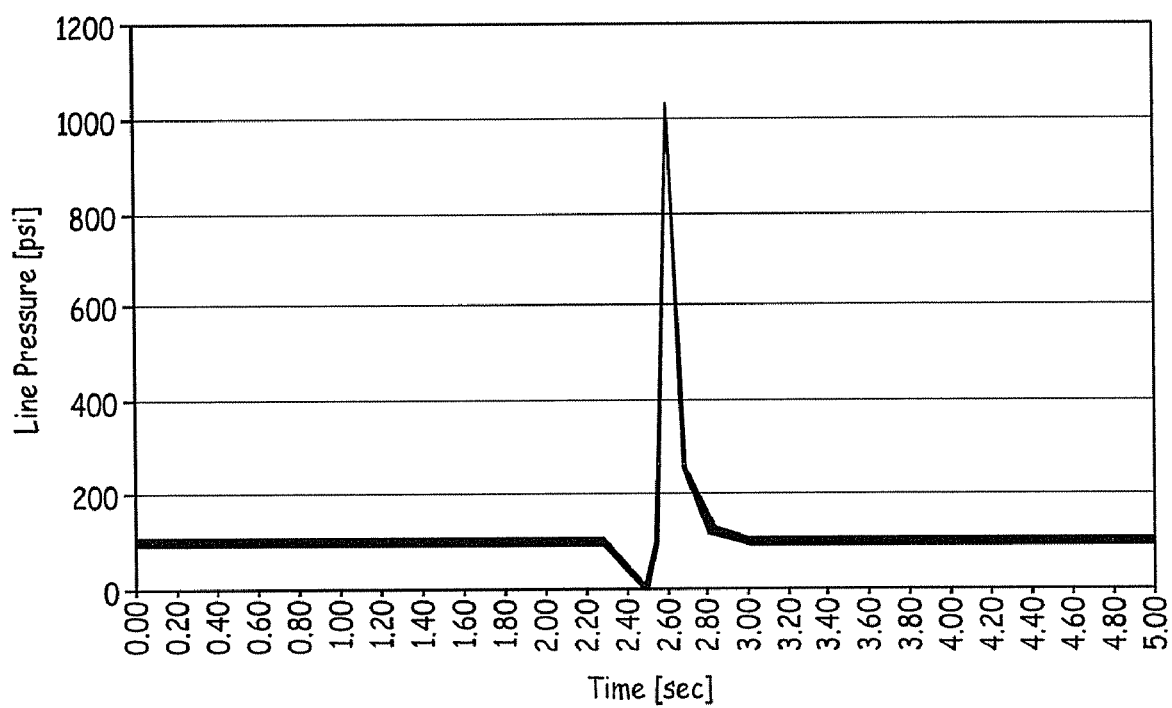
FIG. 6 is a diagrammatic chart of line pressure vs. time depicting a pressure transient.

FIG. 6 is a pressure vs. time chart illustrating a pressure transient as may be encountered in the process fluid control industry. As illustrated in FIG. 6, a line pressure that is nominally approximately 100 psi begins to drop shortly after 2.20 seconds. The drop abruptly ends at 2.50 seconds and quickly spikes from 0 psi to a value over 1000 psi within a time frame of approximately 0.1 seconds. Subsequently, the pressure quickly abates and drops from over 1000 psi to a value close to 100 psi within 0.2 seconds. Accordingly, a pressure change in excess of 1000 psi can be encountered in the time span of less than or equal to approximately 0.3 seconds.

Figure 7:
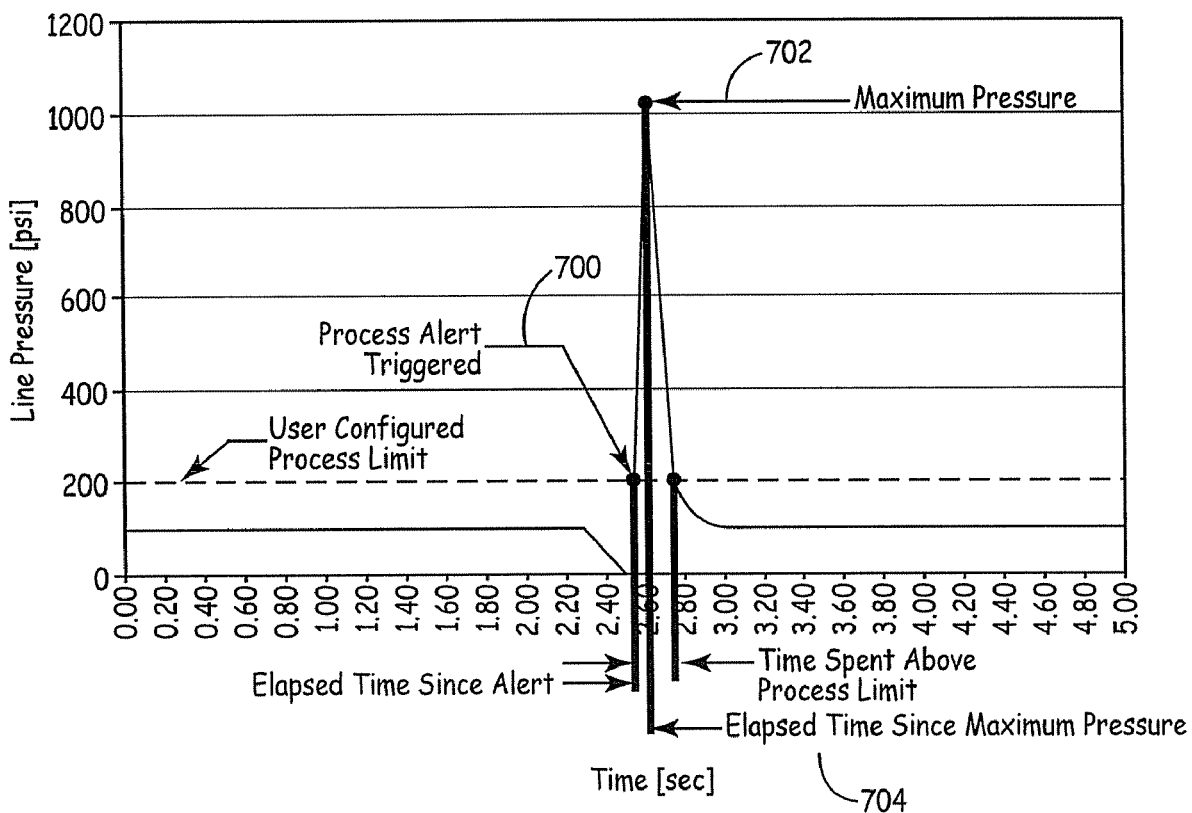
FIG. 7 is a diagrammatic view of various pieces of pressure transient event information relative to the pressure transient of FIG. 6 in accordance with embodiments of the present invention.

FIG. 7 illustrates various metrics in accordance with embodiments of the present invention used in conjunction with the transient depicted in FIG. 6. Specifically, FIG. 7 illustrates a user configured process limit at approximately 200 psi. That limit is exceeded when the point indicated at arrow 700 is reached. That point also begins a timer, or causes the microprocessor to store a time indication, that measures time elapsed since that alert occurred. Shortly thereafter, the maximum pressure is measured and recorded as indicated at arrow 702. Further, a time indication is additionally or alternatively acquired as illustrated at reference numeral 704.

Finally, once the pressure returns to the user-provided threshold, the time at that point from the beginning of the first timer is observed and stored as the "time spent above process limit."

Figure 8:
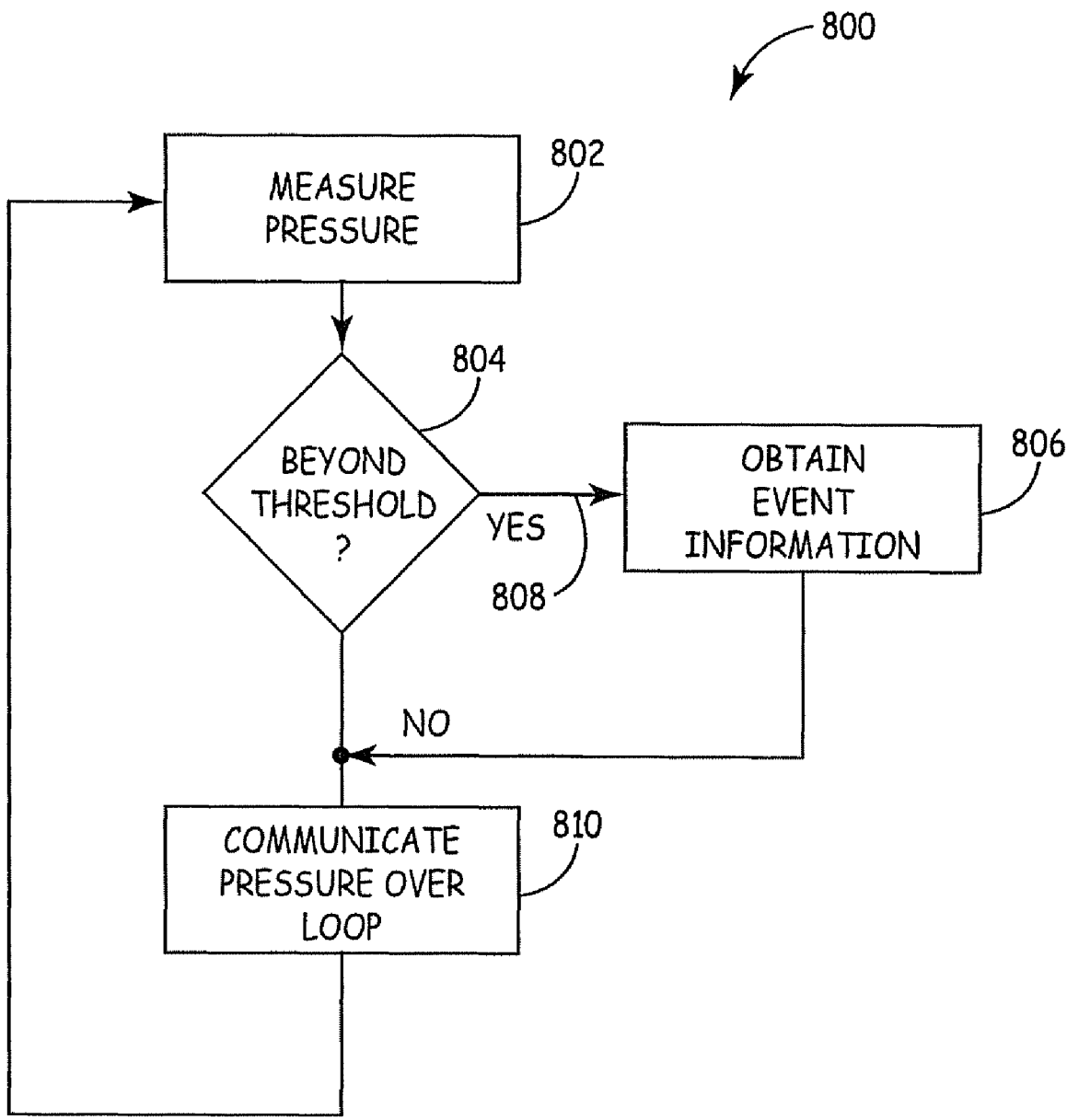
FIG. 8 is a flow diagram of a method of operating a process fluid pressure transmitter in accordance with embodiments of the present invention.

FIG. 8 is a flow diagram of a method of operating a process fluid pressure transmitter in accordance with an embodiment of the present invention. Method 800 begins at block 802 where a process fluid pressure is measured in accordance with known techniques. Then, at block 804, the process fluid pressure transmitter compares the measured pressure with one or more pressure thresholds. If the measured pressure is at or beyond the one or more pressure thresholds, control passes to block 806 along line 808. At block 806, the process fluid pressure transmitter obtains event information. This can include merely setting an alert either locally or communicating it remotely through the process communication loop, and/or obtaining one or more of the various parameters of event information as described above with respect to FIG. 7. Once the event information has been obtained and stored, control passes to block 810 where the measured pressure is communicated over the process communication loop. Similarly, if the pressure measured at block 802 is not beyond one or more pressure thresholds, control also passes to block 810, and the measured pressure is communicated over the process communication loop. Once the pressure has been communicated over the process communication loop, method 800 loops by returning to block 802 where the pressure is measured again.

Although the present invention has been described with reference to preferred embodiments, workers skilled in the art will recognize that changes may be made in form and detail without departing from the spirit and scope of the invention.

What is claimed is:

1. A process fluid pressure transmitter comprising:
a process fluid pressure sensor having an electrical characteristic that varies with process fluid pressure, the pressure sensor being coupleable to a source of process fluid pressure;
measurement circuitry coupled to the process fluid pressure sensor, the measurement circuitry providing a signal indicative of the electrical characteristic of the process fluid pressure sensor at a sensor measurement rate;
a controller coupled to the measurement circuitry to receive the signal and calculate a process fluid pressure based upon the signal, the controller being configured to detect a process fluid pressure transient based upon the signal and store at least one parameter related to the process fluid pressure transient;
a loop communicator coupled to the controller, the loop communicator being configured to provide a transmitter output over a process communication loop based upon the process fluid pressure at a transmitter output rate that is lower than the sensor measurement rate;
wherein the process fluid pressure transmitter is configured to provide an indication related to the at least one stored parameter; and
wherein detection of the process fluid pressure transient includes comparison of the process fluid pressure to at least one user-provided threshold.

2. The process fluid pressure transmitter of claim 1, wherein the process fluid pressure sensor is an absolute pressure sensor.

3. The process fluid pressure transmitter of claim 1, wherein the process fluid pressure sensor is a gage pressure sensor.

4. The process fluid pressure transmitter of claim 1, wherein the process fluid pressure sensor is a differential pressure sensor.

5. The process fluid pressure transmitter of claim 1, wherein both the process fluid pressure and transient detection are performed based on measurements from a single pressure sensor.

6. The process fluid pressure transmitter of claim 1, wherein the controller is embodied upon a feature board disposed within an electronics enclosure of the pressure transmitter.

7. The process fluid pressure transmitter of claim 1, wherein the loop communicator communicates the process fluid pressure in accordance with a process industry standard protocol.

8. The process fluid pressure transmitter of claim 7, wherein the protocol is a 4-20 mA protocol.

9. The process fluid pressure transmitter of claim 7, wherein the protocol is a digital/analog hybrid protocol.

10. The process fluid pressure transmitter of claim 9, wherein the process fluid pressure is provided as a 4-20 mA signal, and wherein the indication related to the at least one stored parameter is communicated digitally over the process communication loop.

11. The process fluid pressure transmitter of claim 7, wherein the process fluid pressure and the indication related to the at least one stored parameter are communicated digitally over the process communication loop.

12. The transmitter of claim 1, wherein the user-provided threshold includes a user-provided pressure threshold.

13. The transmitter of claim 12, wherein the user-provided threshold includes a user-provided temporal threshold.

14. The transmitter of claim 1, wherein the user-provided threshold includes a user-provided temporal threshold.

15. A method of operating a process fluid pressure transmitter, the method comprising:
coupling a pressure sensor to a source of process fluid;
repeatedly measuring process fluid pressure using the pressure sensor and communicating a signal related to each measurement over a process communication loop;
detecting a process fluid pressure transient using the pressure sensor and comparing each pressure measurement to a user-provided threshold;
storing at least one parameter related to the pressure transient in the process fluid pressure transmitter;
providing an indication related to the at least one parameter; and
wherein communicating a signal related to each measurement occurs at a first rate, and measuring process fluid pressure occurs at a second rate higher than the first rate.

16. The method of claim 15, wherein the indication is provided by causing the process fluid pressure transmitter to communicate over the process communication loop.

17. The method of claim 15, wherein the indication is provided by causing the process fluid pressure transmitter to communicate with a handheld field maintenance device coupled to the process fluid pressure transmitter.

18. The method of claim 15, wherein detecting the process fluid pressure transient includes comparing a process fluid pressure measurement with a user-provided pressure threshold.

19. The method of claim 18, wherein the user-provided pressure threshold is a maximum pressure threshold.

20. The method of claim 18, wherein the user-provided pressure threshold is a minimum pressure threshold.

21. The method of claim 15, wherein storing at least one parameter related to the pressure transient includes storing a value indicative of a time at which the transient was detected.

22. The method of claim 15, wherein storing at least one parameter related to the pressure transient includes storing a value indicative of a maximum pressure measured during the transient.

23. The method of claim 15, wherein storing at least one parameter related to the pressure transient includes storing a value indicative of total time spent beyond a user-provided pressure threshold.

24. The method of claim 15, wherein storing at least one parameter related to the pressure transient includes storing a value indicative of a number of transients detected.

25. The method of claim 15, wherein storing a parameter related to the pressure transient includes storing at least one pressure measurement value measured during the transient at the second rate.

26. The method of claim 25, and further comprising storing a time-stamp for each pressure measurement value measured during the pressure transient, at the second rate.

* * * * *